United States Patent
Mo et al.

(10) Patent No.: US 12,432,582 B2
(45) Date of Patent: Sep. 30, 2025

(54) METHOD FOR DETERMINING RADIO LINK STATE AND TERMINAL

(71) Applicant: VIVO MOBILE COMMUNICATION CO., LTD., Guangdong (CN)

(72) Inventors: Yitao Mo, Chang'an Dongguan (CN); Yumin Wu, Chang'an Dongguan (CN); Kai Wu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 677 days.

(21) Appl. No.: 17/122,985

(22) Filed: Dec. 15, 2020

(65) Prior Publication Data

US 2021/0105644 A1    Apr. 8, 2021

Related U.S. Application Data

(63) Continuation of application No. PCT/CN2019/088127, filed on May 23, 2019.

(30) Foreign Application Priority Data

Jun. 15, 2018  (CN) .......................... 201810623954.6

(51) Int. Cl.
*H04W 24/08* (2009.01)
*H04L 5/00* (2006.01)
*H04W 76/19* (2018.01)

(52) U.S. Cl.
CPC ........... *H04W 24/08* (2013.01); *H04L 5/0048* (2013.01); *H04W 76/19* (2018.02)

(58) Field of Classification Search
None
See application file for complete search history.

(56) References Cited

U.S. PATENT DOCUMENTS

| | | | |
|---|---|---|---|
| 10,680,700 B2* | 6/2020 | Chakraborty | H04L 27/2613 |
| 2014/0036659 A1* | 2/2014 | Gao | H04W 28/18 |
| | | | 370/216 |
| 2014/0286176 A1* | 9/2014 | Ro | H04W 36/0094 |
| | | | 370/242 |
| 2018/0007574 A1* | 1/2018 | Park | H04W 36/0085 |

(Continued)

FOREIGN PATENT DOCUMENTS

| | | |
|---|---|---|
| CN | 101483927 A | 7/2009 |
| CN | 102143522 A | 8/2011 |

(Continued)

OTHER PUBLICATIONS

EP Search Report in Application No. 19819064.7 dated Jul. 8, 2021.
(Continued)

*Primary Examiner* — Chirag G Shah
*Assistant Examiner* — Suk Jin Kang
(74) *Attorney, Agent, or Firm* — BROOKS KUSHMAN P.C.

(57) ABSTRACT

A method for determining a radio link state and a terminal are provided. The method includes: performing detection for target reference signals on target resources configured by a network device, to obtain a detection result; and determining, based on the detection result of the target reference signals, whether a radio link state is that target reference signals are undetected.

18 Claims, 3 Drawing Sheets

(56) References Cited

U.S. PATENT DOCUMENTS

| | | | | |
|---|---|---|---|---|
| 2018/0160328 | A1* | 6/2018 | Chendamarai Kannan | H04B 7/0632 |
| 2019/0052377 | A1* | 2/2019 | Hwang | H04L 5/0035 |
| 2019/0052380 | A1* | 2/2019 | Cui | H04W 48/12 |
| 2019/0058532 | A1* | 2/2019 | Nagaraja | H04W 24/08 |
| 2019/0081691 | A1* | 3/2019 | Nagaraja | H04W 56/0005 |
| 2019/0124532 | A1* | 4/2019 | Almalfouh | H04W 76/10 |
| 2019/0173740 | A1* | 6/2019 | Zhang | H04L 41/0677 |
| 2019/0182691 | A1* | 6/2019 | Wang | H04W 24/08 |
| 2019/0268790 | A1* | 8/2019 | Kwon | H04W 24/08 |
| 2019/0289535 | A1* | 9/2019 | Lu | H04W 56/003 |
| 2019/0320333 | A1* | 10/2019 | Koskela | H04B 7/0617 |
| 2019/0372830 | A1* | 12/2019 | Zhang | H04L 41/0894 |
| 2020/0028545 | A1* | 1/2020 | Koskela | H04B 7/0408 |
| 2020/0092018 | A1* | 3/2020 | Hwang | H04B 7/0626 |
| 2020/0274657 | A1* | 8/2020 | Deenoo | H04L 1/0021 |
| 2020/0280378 | A1* | 9/2020 | Hwang | H04B 17/309 |
| 2020/0337103 | A1* | 10/2020 | Harada | H04W 76/27 |
| 2020/0351748 | A1* | 11/2020 | Jung | H04L 5/0048 |
| 2021/0006998 | A1* | 1/2021 | Xu | H04L 1/203 |
| 2021/0028852 | A1* | 1/2021 | Hwang | H04B 17/327 |
| 2021/0037591 | A1* | 2/2021 | Niu | H04L 5/0055 |
| 2021/0068191 | A1* | 3/2021 | Liu | H04W 56/001 |
| 2021/0091844 | A1* | 3/2021 | Koskela | H04B 7/0617 |
| 2021/0099263 | A1* | 4/2021 | Cheng | H04L 5/0048 |
| 2021/0234646 | A1* | 7/2021 | Koskela | H04L 5/0048 |
| 2021/0242922 | A1* | 8/2021 | Koskela | H04W 72/23 |
| 2022/0077917 | A1* | 3/2022 | Nagaraja | H04B 7/0695 |
| 2022/0167191 | A1* | 5/2022 | Kwon | H04W 24/08 |
| 2022/0278731 | A1* | 9/2022 | Koskela | H04B 7/0695 |
| 2023/0015270 | A1* | 1/2023 | Siomina | H04B 7/0617 |
| 2023/0085151 | A1* | 3/2023 | Kim | H04W 72/21 370/225 |
| 2023/0309176 | A1* | 9/2023 | Niu | H04W 28/06 |
| 2024/0205071 | A1* | 6/2024 | Da Silva | H04B 7/0617 |

FOREIGN PATENT DOCUMENTS

| | | |
|---|---|---|
| CN | 107241754 A | 10/2017 |
| CN | 107438263 A | 12/2017 |
| CN | 107787005 A | 3/2018 |
| EP | 3 252 971 A1 | 12/2017 |

OTHER PUBLICATIONS

"Radio link monitoring in NR" 3GPP TSG RAN WG1 NR Ad-Hoc#3, vivo, R1-1715610, Sep. 18, 2017.
"RLM/RLF measurement on NR-U" 3GPP TSG-RAN WG2 Meeting #102, Nokia, Nokia Shanghai Bell, R2-1807126, May 21, 2018.
"RRM framework on NR-U" 3GPP TSG-RAN WG2 #102, Ericsson, TDoc R2-1808149, May 21, 2018.
"RRM Requirements for LAA" 3GPP TSG-RAN WG4 Meeting #79-AH, Qualcomm Incorporated, R4-79-AH-0182, Jun. 28, 2016.
"Discussion on Beam Failure Detection for Beam Management" 3GPP TSG-RAN WG4 Meeting #86bis, Huawei, HiSilicon, R4-1804790, Apr. 16, 2018.
CN Office Action in Application No. 201810623954.6 dated May 8, 2020.
"RRM framework in NR-U", 3GPP TSG-RAN WG2 #102, TDoc R2-1808149, Ericsson, May 21, 2018.
Written Opinion and International Search Report in Application No. PCT/CN2019/088127 dated May 23, 2019.

* cited by examiner

METHOD FOR DETERMINING RADIO LINK STATE AND TERMINAL

CROSS-REFERENCE TO RELATED APPLICATIONS

This application is continuation application of PCT International Application No. PCT/CN2019/088127 filed on May 23, 2019, which claims priority to Chinese Patent Application No. 201810623954.6, filed in China on Jun. 15, 2018, the disclosures of which are incorporated in their entireties by reference herein.

TECHNICAL FIELD

This disclosure relates to the field of communications technologies, and in particular, to a method for determining a radio link state and a terminal.

BACKGROUND

In a 5th Generation (5G) mobile communications system, also referred to as a new radio (NR) system, in a licensed-assisted access (LAA) scenario, also referred to as an unlicensed frequency band transmission scenario, because an unlicensed frequency band is shared by a plurality of technologies, such as wireless routers, radars, and Bluetooth devices, a device working in the unlicensed frequency band needs to use a contention-based distributed coordination access mode, for example, a listen-before-talk (LBT) procedure. Before sending information, a sending node (base station or terminal) needs to perform clear channel assessment (CCA) or extended clear channel assessment (eCCA) to listen to a channel, that is, perform energy detection (ED). When energy is lower than a threshold, transmission can start only when a channel is determined to be idle. The contention-based access mode causes an available time of the channel to be uncertain. A reference signal configured for a terminal at a given time possibly cannot be sent out because a network device has not detected an idle channel. Because the terminal does not receive the reference signal, the terminal cannot determine an accurate radio link state, causing a problem in information transmission between the network device and the terminal.

SUMMARY

Embodiments of this disclosure provide a method for determining a radio link state and a terminal to resolve the problem in information transmission between a network device and a terminal because the terminal cannot determine an accurate radio link state.

According to a first aspect, an embodiment of this disclosure provides a method for determining a radio link state, where the method includes:
  performing detection for target reference signals on target resources configured by a network device, to obtain a detection result; and
  determining, based on the detection result of the target reference signals, whether a radio link state is that target reference signals are undetected.

According to a second aspect, an embodiment of this disclosure further provides a terminal, including:
  a detection module, configured to perform detection for target reference signals on target resources configured by a network device, to obtain a detection result; and
  a processing module, configured to determine, based on the detection result of the target reference signals, whether a radio link state is that target reference signals are undetected.

According to a third aspect, an embodiment of this disclosure provides a terminal, including a processor, a memory, and a computer program stored in the memory and capable of running on the processor, where when the computer program is executed by the processor, steps of the foregoing method for determining a radio link state are implemented.

According to a fourth aspect, an embodiment of this disclosure provides a computer-readable storage medium, where the computer-readable storage medium stores a computer program, and when the computer program is executed by a processor, steps of the foregoing method for determining a radio link state are implemented.

Therefore, in the method for determining a radio link state in the embodiments of this disclosure, the terminal can determine, based on the detection result of the target reference signals, whether the radio link state is that target reference signals are undetected. This improves accuracy of determining the radio link state, avoids reporting of inaccurate radio link state indication information because target reference signals are undetected, and ensures information transmission between the network device and the terminal.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may still derive other drawings from these accompanying drawings without creative efforts.

DESCRIPTION OF EMBODIMENTS

Figure 1:
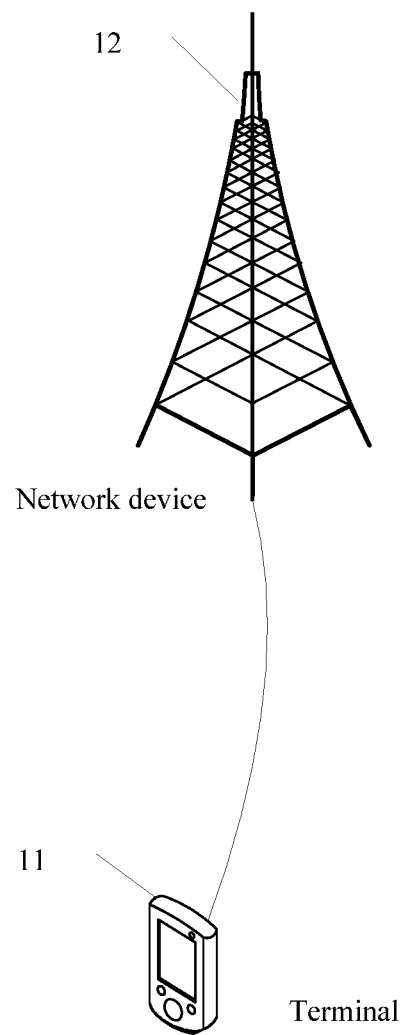
FIG. 1 presents a structural block diagram of a mobile communications system to which an embodiment of this disclosure may be applied.

The following describes exemplary embodiments of this disclosure in more detail with reference to the accompanying drawings. Although the exemplary embodiments of this disclosure are shown in the accompanying drawings, it should be understood that this disclosure may be implemented in various forms and should not be limited by the embodiments set forth herein. On the contrary, the embodiments are provided to enable a more thorough understanding of this disclosure and convey the scope of this disclosure to a person skilled in the art.

The terms "first", "second", and the like in this specification and claims of this application are used to distinguish between similar objects instead of describing a specific order or sequence. It should be understood that the numbers used in this way is interchangeable in appropriate circumstances so that the embodiments of this application described herein can be implemented in other orders than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, system, product, or device. The term "and/or" used in this specification and claims indicates at least one of connected objects.

Technologies described in this specification are not limited to long time evolution (LTE) or LTE-Advanced (LTE-A) systems, but may also be applied to various wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" are often used interchangeably. The CDMA system may implement radio technologies such as CDMA2000 and universal terrestrial radio access (UTRA). UTRA includes wideband CDMA (Wideband Code Division Multiple Access, WCDMA) and other variants of CDMA. The TDMA system may implement radio technologies such as the global system for mobile communications (GSM). The OFDMA system may implement radio technologies such as ultra mobile broadband (UMB), evolved UTRA (E-UTRA), IEEE 802.11 (Wi-Fi), IEEE 802.16 (WiMAX), IEEE 802.20, and Flash-OFDM. UTRA and E-UTRA are parts of a universal mobile telecommunications system (UMTS). LTE and more advanced LTE (for example, LTE-A) are new UMTS versions using E-UTRA. UTRA, E-UTRA, UMTS, LTE, LTE-A, and GSM are described in documents from an organization named "the 3rd Generation Partnership Project" (3GPP). CDMA2000 and UMB are described in documents from an organization named "the 3rd Generation Partnership Project 2" (3GPP2). The technologies described in this specification may be used for the foregoing systems and radio technologies, and may also be used for other systems and radio technologies. However, in the following descriptions, an NR system is described for an illustration purpose, and NR terms are used in most of the following descriptions, although these technologies may also be applied to other applications than the NR system application.

Examples provided in the following description are not intended to limit the scope, applicability, or configuration described in the claims. Functions and arrangements of discussed elements may be changed without departing from the spirit and scope of this disclosure. Various examples may be omitted or replaced properly, or various procedures or components may be added. For example, the described method may be performed in an order different from the described order, and steps may be added, omitted, or combined. In addition, features described with reference to some examples may be combined in other examples.

FIG. 1 shows a structural block diagram of a wireless communications system to which an embodiment of this disclosure may be applied. The wireless communications system includes a terminal 11 and a network device 12. The terminal 11 may also be referred to as a terminal device or user equipment (UE). The terminal 11 may be a terminal-side device such as a mobile phone, a tablet computer, a laptop computer, a personal digital assistant (PDA), a mobile Internet device (MID), a wearable device, or a vehicle-mounted device. It should be noted that a specific type of the terminal 11 is not limited in this embodiment of this disclosure. The network device 12 may be a base station or a core network. The base station may be a 5G base station or a base station of a later version (for example, a gNB or a 5G NR NB), or a base station in another communications system (for example, an eNB, a WLAN access point, or another access point). The base station may be referred to as an access point, a base transceiver station (BTS), a radio base station, a radio transceiver, a basic service set (BSS), an extended service set (ESS), a NodeB, an evolved NodeB (eNB), a home NodeB, a home evolved NodeB, a Wi-Fi node, or another appropriate term in the art. As long as a same technical effect is achieved, the base station is not limited to a specific technical term. It should be noted that only a base station in an NR system is used as an example in this embodiment of this disclosure, but a specific type of the base station is not limited.

Under control of a base station controller, the base station may communicate with the terminal 11. In various examples, the base station controller may be a part of the core network or some base stations. Some base stations may communicate control information or user data with the core network by using backhaul links. In some examples, some of these base stations may communicate with each other directly or indirectly by using backhaul links. The backhaul links may be wired or wireless communications links. The wireless communications system may support operations on multiple carriers (wave signals of different frequencies). A multi-carrier transmitter can transmit modulated signals on the multiple carriers simultaneously. For example, each communications link may transmit multi-carrier signals modulated by using various radio technologies. Each modulated signal may be sent on different carriers and may carry control information (for example, a reference signal or a control channel), overhead information, data, and the like.

The base station may perform wireless communication with the terminal 11 by using one or more access point antennas. Each base station may provide communication coverage for a corresponding coverage area of the base station. A coverage area of an access point may be divided into sectors forming only a part of the coverage area. The wireless communications system may include different types of base stations (for example, a macro base station, a micro base station, or a picocell base station). The base station may also use different radio technologies, for example, a cell or WLAN radio access technology. The base station may be associated with a same or different access networks or operator deployments. Coverage areas of different base stations (including coverage areas of base stations of a same type or different types, coverage areas using a same radio technology or different radio technologies, or coverage areas of a same access network or different access networks) may overlap each other.

A communications link in the wireless communications system may include an uplink for carrying uplink (UL) transmission (for example, from the terminal 11 to the network device 12) or a downlink for carrying downlink (DL) transmission (for example, from the network device 12 to the terminal 11). UL transmission may also be referred to as reverse link transmission, and DL transmission may also be referred to as forward link transmission. A licensed frequency band, an unlicensed frequency band, or both may be used for downlink transmission. Similarly, a licensed frequency band, an unlicensed frequency band, or both may be used for uplink transmission.

Figure 2:
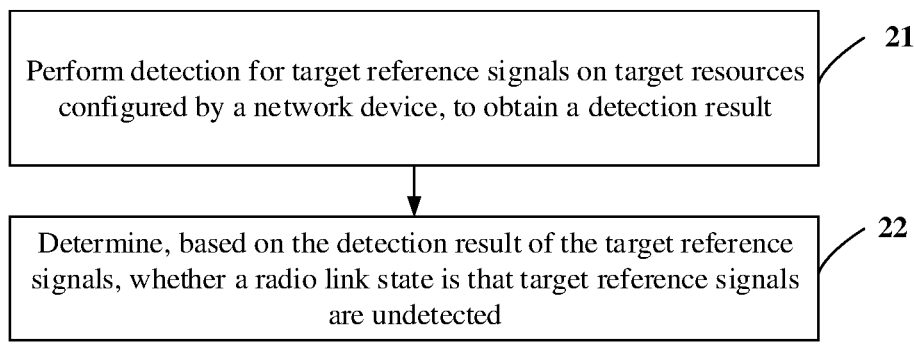
FIG. 2 presents a schematic flowchart of a method for determining a radio link state according to an embodiment of this disclosure.

In the following embodiment, a method for determining a radio link state is further described with reference to an accompanying drawing. As shown in FIG. 2, the method includes the following steps.

Step 21: Perform detection for target reference signals on target resources configured by a network device, to obtain a detection result.

A terminal performs detection for target reference signals to determine downlink radio link quality of a primary cell (PCell) or a primary secondary cell (PSCell). A detection result includes but is not limited to at least one of the following: a quantity of target reference signals configured by the network device, a quantity of detected target reference signals, a quantity of undetected target reference signals, quality parameters of detected target reference signals, and the like. A quality parameter of a detected target reference signal includes but is not limited to at least one of a signal to interference plus noise ratio (SINR), reference signal received power (RSRP), reference signal received quality (RSRQ), and a block error ratio (Block Error Ratio, BLER).

Further, before step 21, the method further includes: determining channel state information reference signals (CSI-RS) and/or synchronization signal and physical broadcast channel blocks (Synchronization Signal & PBCH Block, SSB) as target reference signals; and obtaining transmission positions and a quantity of the target reference signals by using radio resource control (RRC) signaling. The transmission positions herein are the target resources configured by the network device, and the terminal performs detection for the target reference signals in these transmission positions. The quantity of the target reference signals obtained by using the RRC signaling is the quantity of the target reference signals configured by the network device.

Step 22: Determine, based on the detection result of the target reference signals, whether a radio link state is that target reference signals are undetected.

The terminal determines, based on the detection result of the target reference signals, whether the radio link state is that target reference signals are undetected. In an unlicensed frequency band transmission scenario, a reference signal configured for the terminal at a given time possibly cannot be sent out because the network device has not detected an idle channel. Therefore, to improve accuracy of determining the radio link state, the terminal may determine, based on the detection result, whether the radio link state is that target reference signals are undetected. This avoids reporting of inaccurate radio link state indication information because target reference signals are undetected, and prevents the terminal from determining a radio link failure or a beam failure early or frequently.

Step 22 includes but is not limited to the following manners.

Manner 1: Determine, based on the quantity of undetected target reference signals, whether the radio link state is that target reference signals are undetected.

The quantity of undetected target reference signals may be obtained through calculation based on the quantity of the target reference signals that are configured by the network device and a quantity of target reference signals that are actually detected. For example, if the quantity of the target reference signals that are configured by the network device is 10, and the quantity of the target reference signals that are actually detected is 6, the quantity of undetected target reference signals is 10−6=4.

Further, this manner includes but is not limited to the following scenarios.

Scenario 1: Determine, based on the quantity of undetected target reference signals, that the radio link state is that target reference signals are undetected, and report first indication information to an upper layer, wherein the first indication information is used to indicate that target reference signals are undetected.

Herein, specifically, a physical layer of the terminal generates, based on the quantity of undetected target reference signals, the first indication information indicating that target reference signals are undetected, and reports the first indication information to the upper layer or a higher layer, for example, a media access control (MAC) layer or an RRC layer, so that the higher layer further determines a processing policy based on the first indication information.

Using a radio link monitoring (RLM) scenario as an example, when the target reference signals are radio link monitoring reference signals (RLM-RS), if a quantity of undetected RLM-RSs is greater than or equal to a first value, the terminal determines that the radio link state is that reference signals corresponding to RLM are undetected, and reports first indication information to the upper layer, wherein the first indication information is used to indicate that reference signals corresponding to RLM are undetected.

In other words, the physical layer of the terminal determines, based on the quantity of undetected RLM-RSs, whether to report an indication that reference signals corresponding to RLM are undetected to the higher layer. Specifically, the network device notifies the terminal by using RRC signaling that CSI-RSs/SSBs are currently configured as RLM-RSs. It is assumed that the network device configures, in a currently activated BWP, X CSI-RSs/SSBs for the terminal for performing RLM. The terminal performs detection for, based on the CSI-RS/SSB configuration notified by the RRC signaling, the RLM-RSs on given time-frequency resources (that is, the foregoing target resources) for sending the CSI-RSs/SSBs. If the terminal detects an RLM-RS, the terminal measures and calculates, based on the RLM-RS, a quality parameter of the signal, for example, a SINR. If the terminal detects no RLM-RS, the terminal does not perform measurement and calculation.

In the X RLM-RSs configured by the network device, it is assumed that a SINR corresponding to A RLM-RSs and measured and calculated by the terminal is higher than a first threshold SINR_is, and that a SINR corresponding to B RLM-RSs is lower than a second threshold SINR_oos, and that C RLM-RSs are undetected by the terminal. If C is greater than or equal to a first value Thres_C, the physical layer of the terminal reports, to the higher layer, first indication information indicating that reference signals corresponding to RLM are undetected.

It should be noted that values of the first threshold SINR_is, the second threshold SINR_oos, and the first value Thres_C may be selected autonomously by the terminal, or configured by the network device, for example, by using RRC signaling or indicated by using media access control-control element (MAC-CE) and/or downlink control information (DCI).

Alternatively, using a beam failure detection (BFD) scenario as an example, when the target reference signals are beam failure detection reference signals (BFD-RS), if a quantity of undetected BFD-RSs is greater than or equal to a second value, the terminal determines that the radio link state is that reference signals corresponding to BFD are undetected, and reports first indication information to the upper layer, wherein the first indication information is used to indicate that reference signals corresponding to BFD are undetected.

In other words, the physical layer of the terminal determines, based on the quantity of undetected BFD-RSs, whether to report an indication that reference signals corresponding to BFD are undetected to the higher layer. Specifically, the network device notifies the terminal by using RRC signaling that CSI-RSs/SSBs are currently configured as BFD-RSs. It is assumed that the network device configures, in an activated BWP in a serving cell, Y CSI-RSs/SSBs for the terminal for performing BFD. The terminal performs detection for, based on the CSI-RS/SSB configuration notified by the RRC signaling, the BFD-RSs on given time-frequency resources (that is, the foregoing target resources) for sending the CSI-RSs/SSBs. If the terminal detects a BFD-RS, the terminal measures and calculates, based on the BFD-RS, a quality parameter of the signal, for example, a hypothetical physical downlink control channel block error ratio (Physical Downlink Control Channel BLER, PDCCH-BLER). If the terminal detects no BFD-RS, the terminal does not perform measurement and calculation.

In the Y BFD-RSs configured by the network device, it is assumed that a hypothetical PDCCH-BLER corresponding to D BFD-RSs and measured and calculated by the terminal is higher than a preset threshold BLER_bfi, and that E BFD-RSs are undetected by the UE. If E is greater than or equal to a second value Thres_E, the physical layer of the terminal reports, to the higher layer, second indication information indicating that reference signals corresponding to BFD are undetected.

It should be noted that values of the preset threshold BLER_bfi and the second value Thres_E may be selected autonomously by the terminal, or configured by the network device, for example, by using RRC signaling or indicated by using a MAC-CE and/or DCI.

Scenario 2: Determine, based on the quantity of undetected target reference signals, that the radio link state is that target reference signals are undetected, and report second indication information to an upper layer, wherein the second indication information is used to indicate a quantity or a ratio of undetected target reference signals.

Herein, specifically, the physical layer of the terminal generates, based on the quantity of undetected target reference signals, the second indication information indicating the quantity or the ratio of undetected target reference signals, and reports the second indication information to the upper layer or higher layer, so that the higher layer further performs higher layer measurement and calculation or determines a processing policy based on the second indication information.

Using a radio link monitoring scenario as an example, when the target reference signals are radio link monitoring reference signals RLM-RSs, if a quantity of undetected RLM-RSs is greater than 0, the terminal determines that the radio link state is that reference signals corresponding to RLM are undetected, and reports second indication information to the upper layer, wherein the second indication information is used to indicate a quantity or a ratio of undetected reference signals corresponding to RLM.

To be specific, the physical layer of the terminal determines, based on the quantity of undetected RLM-RSs, whether to report the quantity of undetected reference signals corresponding to RLM to the higher layer, or report the ratio of undetected reference signals corresponding to RLM to the higher layer. Specifically, the network device notifies the terminal by using RRC signaling that CSI-RSs/SSBs are currently configured as RLM-RSs. It is assumed that the network device configures, in a currently activated BWP, X CSI-RSs/SSBs for the terminal for performing RLM. The terminal performs detection for, based on the CSI-RS/SSB configuration notified by the RRC signaling, the RLM-RSs on given time-frequency resources (target resources) for sending the CSI-RSs/SSBs. If the terminal detects an RLM-RS, the terminal measures and calculates, based on the RLM-RS, a quality parameter of the signal, for example, a SINR. If the terminal detects no RLM-RS, the terminal does not perform measurement and calculation.

In the X RLM-RSs configured by the network device, it is assumed that a SINR corresponding to A RLM-RSs and measured and calculated by the terminal is higher than a first threshold SINR_is, and that a SINR corresponding to B RLM-RSs is lower than a second threshold SINR_oos, and that C RLM-RSs are undetected by the terminal. If C≠0, that is, if C is greater than 0, the physical layer of the terminal reports, to the higher layer, a quantity C of undetected reference signals corresponding to RLM, or reports a ratio C/X of undetected reference signals corresponding to RLM.

Values of the first threshold SINR_is and the second threshold SINR_oos may be selected autonomously by the terminal, or configured by the network device, for example, by using RRC signaling or indicated by using a MAC-CE and/or DCI.

Alternatively, using a beam failure detection scenario as an example, when the target reference signals are beam failure detection reference signals BFD-RSs, if a quantity of undetected BFD-RSs is greater than 0, the terminal determines that the radio link state is that reference signals corresponding to BFD are undetected, and reports second indication information to the upper layer, wherein the second indication information is used to indicate a quantity or a ratio of undetected reference signals corresponding to BFD.

To be specific, the physical layer of the terminal determines, based on the quantity of undetected BFD-RSs, whether to report the quantity of undetected reference signals corresponding to BFD to the higher layer, or report the ratio of undetected reference signals corresponding to BFD. The network device notifies the terminal by using RRC signaling that CSI-RSs/SSBs are currently configured by the network as BFD-RSs. It is assumed that the network device configures, in an activated BWP in a serving cell, Y CSI-RSs/SSBs for the terminal for performing BFD. The terminal performs detection for, based on the CSI-RS/SSB configuration notified by the RRC signaling, the BFD-RSs on given time-frequency resources (target resources) for sending the CSI-RSs/SSBs. If the terminal detects a BFD-RS, the terminal measures and calculates, based on the BFD-RS, a quality parameter of the signal, for example, a hypothetical PDCCH-BLER. If the terminal detects no BFD-RS, the terminal does not perform measurement and calculation.

In the Y BFD-RSs configured by the network device, it is assumed that a hypothetical PDCCH-BLER corresponding to D BFD-RSs and measured and calculated by the terminal is higher than a preset threshold BLER_bfi, and that E BFD-RSs are undetected by the UE. If E≠0, that is, if E is greater than 0, the physical layer of the terminal reports, to the higher layer, a quantity E of undetected reference signals corresponding to BFD, or reports a ratio E/Y of undetected reference signals corresponding to BFD.

It should be noted that a value of the preset threshold BLER_bfi may be selected autonomously by the terminal, or configured by the network device, for example, by using RRC signaling or indicated by using a MAC-CE and/or DCI.

The foregoing describes the scenarios of determining, based on the quantity of undetected target reference signals, that the radio link state is that target reference signals are undetected. The following embodiment further describes scenarios of determining, based on the quantity of undetected target reference signals, that the radio link state is not that target reference signals are undetected. The scenarios of determining, based on the quantity of undetected target reference signals, that the radio link state is not that target reference signals are undetected include but are not limited to the following scenarios.

Scenario 3: When the target reference signals are radio link monitoring reference signals RLM-RSs, if a quantity of undetected RLM-RSs is greater than or equal to a third value, determine that the radio link state is out-of-synchronization (out-of-sync, OOS), and report OOS indication information to an upper layer.

In this scenario, the physical layer of the terminal determines, based on the quantity of undetected RLM-RSs, whether to report an OOS indication to the higher layer. Specifically, the network device notifies the terminal by using RRC signaling that CSI-RSs/SSBs are currently configured by the network as RLM-RSs. It is assumed that the network device configures, in a currently activated BWP, X CSI-RSs/SSBs for the terminal for performing RLM. The terminal performs detection for, based on the CSI-RS/SSB configuration notified by the RRC signaling, the RLM-RSs on given time-frequency resources (target resources) for sending the CSI-RSs/SSBs. If the terminal detects an RLM-RS, the terminal measures and calculates, based on the RLM-RS, a quality parameter of the signal, for example, a SINR. If the terminal detects no RLM-RS, the terminal does not perform measurement and calculation.

In the X RLM-RSs configured by the network device, it is assumed that a SINR corresponding to A RLM-RSs and measured and calculated by the terminal is higher than a first threshold SINR_is, and that a SINR corresponding to B RLM-RSs is lower than a second threshold SINR_oos, and that C RLM-RSs are undetected by the terminal. If C is greater than or equal to a third value Thres_C_oos, the physical layer of the terminal reports an OOS indication to the higher layer.

It should be noted that values of the first threshold SINR_is, the second threshold SINR_os, and the third value Thres_C_oos may be selected autonomously by the terminal, or configured by the network device, for example, by using RRC signaling or indicated by using a MAC-CE and/or DCI.

Scenario 4: When the target reference signals are beam failure detection reference signals BFD-RSs, if a quantity of undetected BFD-RSs is greater than or equal to a fourth value, determine that the radio link state is a beam failure, and report beam failure instance BFI indication information to an upper layer.

In this scenario, the physical layer of the terminal determines, based on the quantity of undetected BFD-RSs, whether to report a BFI indication to the higher layer. Specifically, the network device notifies the terminal by using RRC signaling that CSI-RSs/SSBs are currently configured by the network as BFD-RSs. It is assumed that the network device configures, in an activated BWP in a serving cell, Y CSI-RSs/SSBs for the terminal for performing BFD. The terminal performs detection for, based on the CSI-RS/SSB configuration notified by the RRC signaling, the BFD-RSs on given time-frequency resources (target resources) for sending the CSI-RSs/SSBs. If the terminal detects a BFD-RS, the terminal measures and calculates, based on the BFD-RS, a quality parameter of the signal, for example, a hypothetical PDCCH-BLER. If the terminal detects no BFD-RS, the terminal does not perform measurement and calculation.

In the Y BFD-RSs configured by the network device, it is assumed that a hypothetical PDCCH-BLER corresponding to D BFD-RSs and measured and calculated by the terminal is higher than a preset threshold BLER_bfi, and that E BFD-RSs are undetected by the terminal. If E is greater than or equal to a fourth value Thres_E_bfi, the physical layer of the terminal reports a BFI indication to the higher layer.

Values of the preset threshold BLER_bfi and the fourth value Thres_E_bfi may be selected autonomously by the terminal, or configured by the network device, for example, by using RRC signaling or indicated by using a MAC-CE and/or DCI.

Different implementations and application scenarios about how to determine, based on the quantity of undetected target reference signals, whether the radio link state is that target reference signals are undetected, are described in the manner 1 above. The following embodiment further describes another manner of determining whether the radio link state is that target reference signals are undetected.

Manner 2: Determine, based on the quantity and quality parameters of detected target reference signals, whether the radio link state is that target reference signals are undetected.

This manner includes but is not limited to the following scenarios.

Scenario 1: A radio link monitoring scenario, that is, a scenario in which the target reference signals are radio link monitoring reference signals RLM-RSs.

The step of determining, based on the quantity and quality parameters of detected target reference signals, whether the radio link state is that target reference signals are undetected includes at least one of the following:

1-1. when a first quantity of RLM-RSs whose quality parameters are greater than or equal to a first threshold is greater than or equal to a fifth value, determining that the radio link state is in-synchronization (in-sync, IS), and reporting IS indication information to an upper layer;

1-2. when a second quantity of RLM-RSs whose quality parameters are less than or equal to a second threshold is greater than or equal to a sixth value, determining that the radio link state is OOS, and reporting OOS indication information to the upper layer;

1-3. when a third quantity of undetected RLM-RSs is greater than or equal to a seventh value, determining that the radio link state is that reference signals corresponding to RLM are undetected, and reporting third indication information to the upper layer, wherein the third indication information is used to indicate that reference signals corresponding to RLM are undetected;

1-4. when the second quantity is less than or equal to an eighth value, or the third quantity is less than or equal to a ninth value, or a sum of the second quantity and the third quantity is less than or equal to a tenth value, determining that the radio link state is IS, and reporting IS indication information to the upper layer; and 1-5. when the sum of the second quantity and the third quantity is greater than or equal to an eleventh value, determining that the radio link state is OOS, and reporting OOS indication information to the upper layer.

Any quantity of the foregoing judgment branches 1-1, 1-2, 1-3, 1-4, and 1-5 in any order may be combined. In this embodiment, only one combination thereof is used as an example for description. However, the example is not intended to limit an implementation of this embodiment. A person skilled in the art should understand that any combination of the foregoing five judgment branches is applicable to this embodiment of this disclosure.

In this scenario, based on the quantity and quality parameters of detected target reference signals, the terminal determines that the physical layer reports an IS indication or an OOS or an indication that reference signals corresponding to RLM are undetected to the higher layer.

One combination of 1-1, 1-2, 1-3, 1-4, and 1-5 is used as an example for description. For example, the network device notifies the terminal by using RRC signaling that CSI-RSs/SSBs are currently configured by the network as RLM-RSs. It is assumed that the network device configures, in a currently activated BWP, X CSI-RS s/SSB s for the terminal for performing RLM. The terminal performs detection for, based on the CSI-RS/SSB configuration notified by the RRC signaling, the RLM-RSs on given time-frequency resources (target resources) for sending the CSI-RSs/SSBs. If the terminal detects an RLM-RS, the terminal measures and calculates, based on the RLM-RS, a quality parameter of the signal, for example, a SINR. If the terminal detects no RLM-RS, the terminal does not perform measurement and calculation.

In the X RLM-RSs configured by the network device, it is assumed that a SINR corresponding to A RLM-RSs and measured and calculated by the terminal is higher than a first threshold SINR_is, and that a SINR corresponding to B RLM-RSs is lower than a second threshold SINR_oos, and that C RLM-RSs are undetected by the terminal.

(a) If A is greater than or equal to a fifth value Thres_A_is, the physical layer of the terminal reports an IS indication to the higher layer. This judgment branch corresponds to 1-1. If better downlink transmission quality needs to be provided, the fifth value Thres_A_is may be set to a larger value; otherwise, it may be set to a smaller value.

(b) Otherwise, if C is greater than or equal to a seventh value Thres_C_lbtf, the physical layer of the terminal reports, to the higher layer, an indication that reference signals corresponding to RLM are undetected. This judgment branch corresponds to 1-3. When better downlink transmission quality needs to be provided, the seventh value Thres_C_lbtf may be set to a smaller value; otherwise, it may be set to a larger value.

(c) Otherwise, if B is greater than or equal to a sixth value Thres_B_oos, the physical layer of the terminal reports an OOS indication to the higher layer. This judgment branch corresponds to 1-2. When better downlink transmission quality needs to be provided, the sixth value Thres_B_oos may be set to a smaller value; otherwise, it may be set to a larger value.

(d) Otherwise, if B is less than or equal to an eighth value Thres_B_is, or C is less than or equal to a ninth value Thres_C_is, or a sum of B and C is less than or equal to a tenth value Thres_BC_is, the physical layer of the terminal reports an IS indication to the higher layer. This judgment branch corresponds to 1-4. When better downlink transmission quality needs to be provided, the eighth value Thres_B_is, the ninth value Thres_C_is, or the tenth value Thres_BC_is may be set to a smaller value; otherwise, it may be set to a larger value.

(e) Otherwise, if a sum of B and C is greater than or equal to an eleventh value Thres_BC_oos, the physical layer of the terminal reports an OOS indication to the higher layer. This judgment branch corresponds to 1-5. When better downlink transmission quality needs to be provided, the eleventh value Thres_BC_oos may be set to a smaller value; otherwise, it may be set to a larger value.

Values of the first threshold SINR_is, the second threshold SINR_oos, the fifth value Thres_A_is, the sixth value Thres_B_oos, the seventh value Thres_C_lbtf, the eighth value Thres_B_is, the ninth value Thres_C_is, the tenth value Thres_BC_is, and the eleventh value Thres_BC_oos may be selected autonomously by the terminal, or configured by the network device, for example, by using RRC signaling or indicated by using a MAC-CE and/or DCI.

Scenario 2: A beam failure detection scenario, that is, a scenario in which the target reference signals are beam failure detection reference signals BFD-RSs.

The step of determining, based on the quantity and quality parameters of detected target reference signals, whether the radio link state is that target reference signals are undetected includes at least one of the following:

2-1. when a quantity of undetected BFD-RSs is greater than or equal to a twelfth value, determining that the radio link state is that reference signals corresponding to BFD are undetected, and reporting fourth indication information to an upper layer, wherein the fourth indication information is used to indicate that reference signals corresponding to BFD are undetected;

2-2. when a quantity of BFD-RSs whose quality parameters are less than or equal to a third threshold is greater than or equal to a thirteenth value, determining that the radio link state is a beam failure, and reporting BFI indication information to the upper layer; and 2-3. when a sum of the quantity of undetected BFD-RSs and the quantity of the BFD-RSs whose quality parameters are less than or equal to the third threshold is greater than or equal to a fourteenth value, determining that the radio link state is a beam failure, and reporting BFI indication information to the upper layer.

Any quantity of the foregoing judgment branches 2-1, 2-2, and 2-3 in any order may be combined. In this embodiment, only one combination thereof is used as an example for description. However, the example is not intended to limit an implementation of this embodiment. A person skilled in the art should understand that any combination of the foregoing three judgment branches is applicable to this embodiment of this disclosure.

In this scenario, based on the quantity and quality parameters of detected target reference signals, the terminal determines that the physical layer reports a BFI indication or an indication that reference signals corresponding to BFD are undetected to the higher layer.

One combination of 2-1, 2-2, and 2-3 is used as an example for description. For example, the network device notifies the terminal by using RRC signaling that CSI-RSs/SSBs are configured as BFD-RSs. It is assumed that the network device configures, in an activated BWP in a serving cell, Y CSI-RSs/SSBs for the terminal for performing BFD. The terminal performs detection for, based on the CSI-RS/SSB configuration notified by the RRC signaling, the BFD-RSs on given time-frequency resources (target resources) for sending the CSI-RSs/SSBs. If the terminal detects a BFD-RS, the terminal measures and calculates, based on the BFD-RS, a quality parameter of the signal, for example, a hypothetical PDCCH-BLER. If the terminal detects no BFD-RS, the terminal does not perform measurement and calculation.

In the Y BFD-RSs configured by the network device, it is assumed that a hypothetical PDCCH-BLER corresponding to D BFD-RSs and measured and calculated by the terminal is higher than a preset threshold BLER_bfi, that is, quality parameters of the D BFD-RSs are less than or equal to a third threshold, and that E BFD-RSs are undetected by the terminal.

(a) If D is greater than or equal to a thirteenth value Thres_D_bfi, the physical layer of the terminal reports a BFI indication to the higher layer. This judgment branch corresponds to 2-2. When quality of a serving beam needs to be more reliable, the thirteenth value Thres_D_bfi may be set to a smaller value; otherwise, it may be set to a larger value.

(b) Otherwise, if E is greater than or equal to a twelfth value Thres_E, the physical layer of the terminal reports an indication that reference signals corresponding to BFD are undetected to the higher layer. This judgment branch corresponds to 2-1.

(c) Otherwise, if a sum of E and D is greater than or equal to a fourteenth value Thres_DE_bfi, the physical layer of the terminal reports a BFI indication to the higher layer. This judgment branch corresponds to 2-3. When quality of a serving beam needs to be more reliable, Thres_DE_bfi may be set to a smaller value; otherwise, it may be set to a larger value.

Values of the preset threshold BLER_bfi, the twelfth value Thres_E, the thirteenth value Thres_D_bfi, and the fourteenth value Thres_DE_bfi may be selected autonomously by the terminal, or configured by the network device, for example, by using RRC signaling or indicated by using a MAC-CE and/or DCI.

It should be noted that in an unlicensed frequency band transmission scenario, a reference signal configured for the terminal at a given time possibly cannot be sent out because the network device has not detected an idle channel. If the terminal determines that the radio link state is that target reference signals are undetected, accuracy of determining the radio link state can be improved. This avoids reporting of inaccurate radio link state indication information because target reference signals are undetected, and prevents the terminal from determining a radio link failure or a beam failure early or frequently.

Using a radio link monitoring scenario as an example, when the physical layer of the terminal reports an OOS indication to the higher layer, if the higher layer continuously receives N310 OOS indications, a timer T310 is started. If the timer T310 expires, the terminal determines a radio link failure (RLF), and user plane data transmission between the terminal and the network device is interrupted. If the physical layer of the terminal reports an IS indication to the higher layer, and the higher layer continuously receives N311 IS indications, the timer T310 is stopped. Values of N310 and N311, and running duration of T310 may all be configured by the network device.

Using a beam failure detection scenario as an example, a beam failure detection timer (BFD timer) and a beam failure instance counter (BFI counter) are designed for the higher layer of the terminal. After receiving a BFI indication reported by the physical layer, the higher layer of the terminal starts or restarts the beam failure instance counter, and performs an operation of adding 1 to the counter. If the beam failure detection timer expires, the higher layer of the terminal resets the counter to 0. If a count in the counter is greater than or equal to a maximum count configured by the network, the terminal determines that a beam failure occurs in a current serving cell, and triggers a beam recovery process.

In the method for determining a radio link state in the embodiments of this disclosure, the terminal can determine, based on the detection result of the target reference signals, whether the radio link state is that target reference signals are undetected. This improves accuracy of determining the radio link state, avoids reporting of inaccurate radio link state indication information because target reference signals are undetected, and ensures information transmission between the network device and the terminal.

The method for determining a radio link state in different scenarios is described in the foregoing embodiments. With reference to an accompanying drawing, the following further describes a terminal corresponding to the method.

Figure 3:
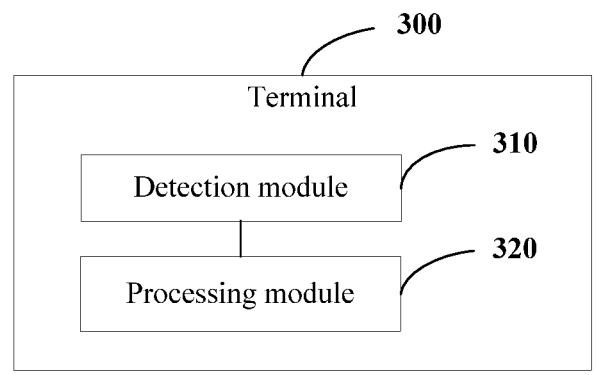
FIG. 3 presents a schematic modular structural diagram of a terminal according to an embodiment of this disclosure.

As shown in FIG. 3, a terminal 300 in an embodiment of this disclosure can implement details of the method in the foregoing embodiment and achieve a same effect: performing detection for target reference signals on target resources configured by a network device, to obtain a detection result; and determining, based on the detection result of the target reference signals, whether a radio link state is that target reference signals are undetected. The terminal 300 specifically includes the following functional modules:

a detection module 310, configured to perform detection for target reference signals on target resources configured by a network device, to obtain a detection result; and a processing module 320, configured to determine, based on the detection result of the target reference signals, whether a radio link state is that target reference signals are undetected.

The processing module 320 includes:
a first processing submodule, configured to determine, based on a quantity of undetected target reference signals, whether the radio link state is that target reference signals are undetected; or
a second processing submodule, configured to determine, based on a quantity and quality parameters of detected target reference signals, whether the radio link state is that target reference signals are undetected.

The first processing submodule includes:
a first processing unit, configured to determine, based on the quantity of undetected target reference signals, that the radio link state is that target reference signals are undetected, and report first indication information to an upper layer, wherein the first indication information is used to indicate that target reference signals are undetected; or
a second processing unit, configured to determine, based on the quantity of undetected target reference signals, that the radio link state is that target reference signals are undetected, and report second indication information to an upper layer, wherein the second indication information is used to indicate a quantity or a ratio of undetected target reference signals.

The first processing unit includes:
a first processing subunit, configured to: when the target reference signals are radio link monitoring reference signals RLM-RSs, if a quantity of undetected RLM-RSs is greater than or equal to a first value, determine that the radio link state is that reference signals corresponding to RLM are undetected, and report first indication information to the upper layer, wherein the first indication information is used to indicate that reference signals corresponding to RLM are undetected; or
a second processing subunit, configured to: when the target reference signals are beam failure detection reference signals BFD-RSs, if a quantity of undetected BFD-RSs is greater than or equal to a second value, determine that the radio link state is that reference signals corresponding to BFD are undetected, and report first indication information to the upper layer, wherein the first indication information is used to indicate that reference signals corresponding to BFD are undetected.

The second processing unit includes:
a third processing subunit, configured to: when the target reference signals are radio link monitoring reference signals RLM-RSs, if a quantity of undetected RLM-RSs is greater than 0, determine that the radio link state is that reference signals corresponding to RLM are undetected, and report second indication information to the upper layer, wherein the second indication information is used to indicate a quantity or a ratio of undetected reference signals corresponding to RLM; or
a fourth processing subunit, configured to: when the target reference signals are beam failure detection reference signals BFD-RSs, if a quantity of undetected BFD-RSs is greater than 0, determine that the radio link state is that reference signals corresponding to BFD are undetected, and report second indication information to the upper layer, wherein the second indication information is used to indicate a quantity or a ratio of undetected reference signals corresponding to BFD.

The first processing submodule includes:
a third processing unit, configured to: when the target reference signals are radio link monitoring reference signals RLM-RSs, if a quantity of undetected RLM-RSs is greater than or equal to a third value, determine that the radio link state is out-of-synchronization OOS, and report OOS indication information to an upper layer; or
a fourth processing unit, configured to: when the target reference signals are beam failure detection reference signals BFD-RSs, if a quantity of undetected BFD-RSs is greater than or equal to a fourth value, determine that the radio link state is a beam failure, and report beam failure instance BFI indication information to an upper layer.

When the target reference signals are radio link monitoring reference signals RLM-RSs, the second processing submodule comprises at least one of the following:
a fifth processing unit, configured to: when a first quantity of RLM-RSs whose quality parameters are greater than or equal to a first threshold is greater than or equal to a fifth value, determine that the radio link state is in-synchronization IS, and report IS indication information to an upper layer;
a sixth processing unit, configured to: when a second quantity of RLM-RSs whose quality parameters are less than or equal to a second threshold is greater than or equal to a sixth value, determine that the radio link state is OOS, and report OOS indication information to the upper layer;
a seventh processing unit, configured to: when a third quantity of undetected RLM-RSs is greater than or equal to a seventh value, determine that the radio link state is that reference signals corresponding to RLM are undetected, and report third indication information to the upper layer, wherein the third indication information is used to indicate that reference signals corresponding to RLM are undetected;
an eighth processing unit, configured to: when the second quantity is less than or equal to an eighth value, or the third quantity is less than or equal to a ninth value, or a sum of the second quantity and the third quantity is less than or equal to a tenth value, determine that the radio link state is IS, and report IS indication information to the upper layer; and
a ninth processing unit, configured to: when the sum of the second quantity and the third quantity is greater than or equal to an eleventh value, determine that the radio link state is OOS, and report OOS indication information to the upper layer.

When the target reference signals are beam failure detection reference signals BFD-RSs, the second processing submodule comprises at least one of the following:
a tenth processing unit, configured to: when a quantity of undetected BFD-RSs is greater than or equal to a twelfth value, determine that the radio link state is that reference signals corresponding to BFD are undetected, and report fourth indication information to an upper layer, wherein the fourth indication information is used to indicate that reference signals corresponding to BFD are undetected;
an eleventh processing unit, configured to: when a quantity of BFD-RSs whose quality parameters are less than or equal to a third threshold is greater than or equal to a thirteenth value, determine that the radio link state is a beam failure, and report BFI indication information to the upper layer; and
a twelfth processing unit, configured to: when a sum of the quantity of undetected BFD-RSs and the quantity of the BFD-RSs whose quality parameters are less than or equal to the third threshold is greater than or equal to a fourteenth value, determine that the radio link state is a beam failure, and report BFI indication information to the upper layer.

The quality parameter comprises at least one of a signal to interference plus noise ratio SINR, reference signal received power RSRP, reference signal received quality RSRQ, and a block error ratio BLER.

The terminal 300 further includes:
a determining module, configured to determine channel state information reference signals CSI-RSs and/or synchronization signal and physical broadcast channel blocks SSBs as target reference signals; and
an obtaining module, configured to obtain transmission positions and a quantity of the target reference signals by using radio resource control RRC signaling.

It should be noted that the terminal in this embodiment of this disclosure can determine, based on the detection result of the target reference signals, whether the radio link state is that target reference signals are undetected. This improves accuracy of determining the radio link state, avoids reporting of inaccurate radio link state indication information because target reference signals are undetected, and ensures information transmission between the network device and the terminal.

It should be noted that, it should be understood that division of modules of the terminal is merely logical function division. The modules may be all or partially integrated in a physical entity or may be separated physically in actual implementation. In addition, the modules may be all implemented in a form of software for calling by a processing component, or may be all implemented in a form of hardware; or some of the modules may be implemented in a form of software for calling by a processing component, and the rest modules may be implemented in a form of hardware. For example, the determining module may be a processing component that is separately provided, or may be integrated in a chip of the apparatus for implementation. In addition, the determining module may be stored in a memory of the apparatus in a form of program code, and is called by a processing component of the apparatus to perform a function of the determining module. Implementation of other modules is similar to this. In addition, the modules may be all or partially integrated, or may be implemented separately. Herein, the processing component may be an integrated circuit, and has a signal processing capability. In an implementation process, the steps in the foregoing method or the foregoing modules can be implemented by using a hardware integrated logic circuit in the processor component, or by using instructions in a form of software.

For example, the modules may be configured as one or more integrated circuits for implementing the foregoing method, for example, one or more application-specific integrated circuits (ASIC), or one or more microprocessors, or one or more digital signal processors (DSP), or one or more field programmable gate arrays (FPGA). For another example, when one of the foregoing modules is implemented in a form of program code for calling by the processing component, the processing component may be a general purpose processor, for example, a central processing unit (CPU) or another processor that may invoke program code. For another example, the modules may be integrated and implemented in a form of a system-on-a-chip (SOC).

Figure 4:
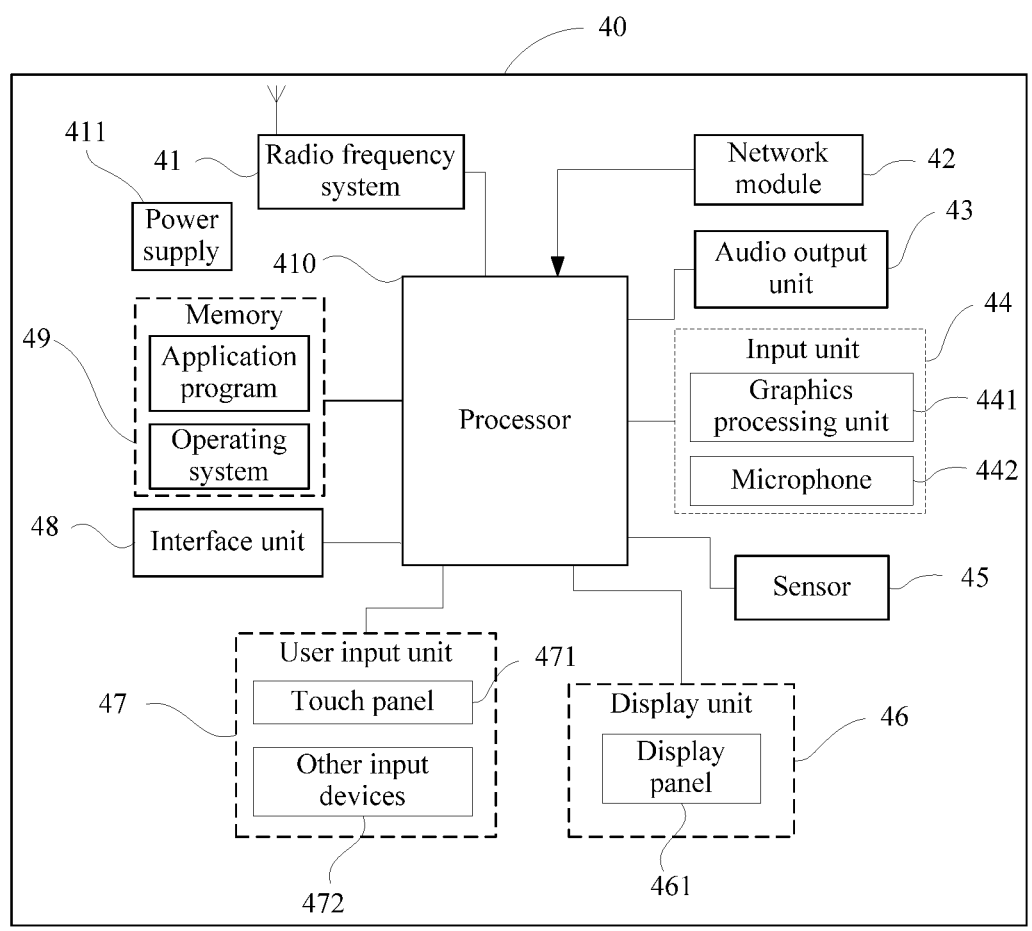
FIG. 4 presents a schematic diagram of a hardware structure of a terminal according to an embodiment of this disclosure.

To better achieve the foregoing objective, further, FIG. 4 is a schematic diagram of a hardware structure of a terminal for implementing the embodiments of this disclosure. The terminal 40 includes but is not limited to components such as a radio frequency unit 41, a network module 42, an audio output unit 43, an input unit 44, a sensor 45, a display unit 46, a user input unit 47, an interface unit 48, a memory 49, a processor 410, and a power supply 411. A person skilled in the art may understand that the structure of the terminal shown in FIG. 4 does not constitute a limitation on the terminal. The terminal may include more or fewer components than those shown in the figure, or combine some of the components, or arrange the components differently. In this embodiment of this disclosure, the terminal includes but is not limited to a mobile phone, a tablet computer, a laptop computer, a palmtop computer, an in-vehicle terminal, a wearable device, a pedometer, or the like.

The radio frequency unit 41 is configured to perform detection for target reference signals on target resources configured by a network device, to obtain a detection result.

The processor 410 is configured to determine, based on the detection result of the target reference signals, whether a radio link state is that target reference signals are undetected.

The terminal in this embodiment of this disclosure can determine, based on the detection result of the target reference signals, whether the radio link state is that target reference signals are undetected. This improves accuracy of determining the radio link state, avoids reporting of inaccurate radio link state indication information because target reference signals are undetected, and ensures information transmission between the network device and the terminal.

It should be understood that in this embodiment of this disclosure, the radio frequency unit 41 may be configured to receive and send signals in an information reception or transmission or call process. Specifically, after receiving downlink data from a base station, the radio frequency unit 401 sends the downlink data to the processor 410 for processing, and in addition, sends uplink data to the base station. Generally, the radio frequency unit 41 includes but is not limited to an antenna, at least one amplifier, a transceiver, a coupler, a low noise amplifier, a duplexer, and the like. In addition, the radio frequency unit 41 may further communicate with a network and another device through a wireless communications system.

The terminal provides wireless broadband internet access for a user by using the network module 42, for example, helping the user send and receive e-mails, browse web pages, and access streaming media.

The audio output unit 43 may convert audio data received by the radio frequency unit 41 or the network module 42 or stored in the memory 49 into an audio signal, and output the audio signal as a sound. In addition, the audio output unit 43 may also provide audio output (for example, a call signal received sound or a message received sound) related to a specific function performed by the terminal 40. The audio output unit 43 includes a speaker, a buzzer, a telephone receiver, and the like.

The input unit 44 is configured to receive an audio or video signal. The input unit 44 may include a graphics processing unit (GPU) 441 and a microphone 442. The graphics processing unit 441 processes image data of a still picture or a video obtained by an image capture apparatus (for example, a camera) in an image capture mode or a video capture mode. A processed image frame may be displayed on the display unit 46. An image frame processed by the graphics processing unit 441 may be stored in the memory 49 (or another storage medium) or sent by the radio frequency unit 41 or the network module 42. The microphone 442 can receive a sound and can process the sound into audio data. The processed audio data may be converted in a telephone call mode into a format that can be sent by the radio frequency unit 41 to a mobile communications base station, for outputting.

The terminal 40 further includes at least one sensor 45, for example, a light sensor, a motion sensor, and another sensor. Specifically, the light sensor includes an ambient light sensor and a proximity sensor. The ambient light sensor may adjust luminance of a display panel 461 based on brightness of ambient light. The proximity sensor may turn off and/or backlight the display panel 461 when the terminal 40 moves to an ear. As a type of motion sensor, an accelerometer sensor may detect acceleration magnitudes in all directions (generally three axes), and when the accelerometer sensor is stationary, may detect a magnitude and a direction of gravity, and may be configured for terminal posture recognition (such as switching between landscape and portrait, related games, and magnetometer posture calibration), vibration recognition related functions (such as a pedometer and stroke), and the like. The sensor 45 may further include a fingerprint sensor, a pressure sensor, an iris sensor, a molecular sensor, a gyroscope, a barometer, a hygrometer, a thermometer, an infrared sensor, and the like. Details are not described herein.

The display unit 46 is configured to display information input by the user or information provided for the user. The display unit 46 may include the display panel 461. The display panel 461 may be configured in a form of a liquid crystal display (LCD), an organic light-emitting diode (OLED), or the like.

The user input unit 47 may be configured to receive input digit or character information and generate a key signal input related to user setting and function control of the terminal. Specifically, the user input unit 47 includes a touch panel 471 and other input devices 472. The touch panel 471, also referred to as a touchscreen, may capture a touch operation performed by a user on or near the touch panel (for example, an operation performed by the user on the touch panel 471 or near the touch panel 471 by using any appropriate object or accessory such as a finger or a stylus). The touch panel 471 may include two parts: a touch detection apparatus and a touch controller. The touch detection apparatus detects a touch direction of the user, detects a signal brought by a touch operation, and transmits the signal to the touch controller. The touch controller receives touch information from the touch detection apparatus, converts the touch information into point coordinates, sends the point coordinates to the processor 410, and receives and executes a command sent by the processor 410. In addition, the touch panel 471 may be implemented in a plurality of forms, for example, as a resistive, capacitive, infrared, or surface acoustic wave touch panel. The user input unit 47 may further include the other input devices 472 in addition to the touch panel 471. Specifically, the other input devices 472 may include but are not limited to a physical keyboard, a function key (such as a volume control key or a power on/off key), a trackball, a mouse, a joystick, and the like. Details are not described herein.

Further, the touch panel 471 may cover the display panel 461. After the touch panel 471 detects a touch operation on or near the touch panel, the touch panel 471 transmits the touch operation to the processor 410 to determine a type of a touch event. Then the processor 410 provides a corresponding visual output on the display panel 461 based on the type of the touch event. Although the touch panel 471 and the display panel 461 are used as two independent components to implement input and output functions of the terminal in FIG. 4, the touch panel 471 and the display panel 461 may be integrated to implement the input and output functions of the terminal in some embodiments. This is not specifically limited herein.

The interface unit 48 is an interface connecting an external apparatus to the terminal 40. For example, the external apparatus may include a wired or wireless headphone port, an external power (or battery charger) port, a wired or wireless data port, a memory card port, a port for connecting an apparatus provided with an identification module, an audio input/output (I/O) port, a video I/O port, an earphone port, and the like. The interface unit 48 may be configured to receive input (for example, data information or power) from the external apparatus, and transmit the received input to one or more elements in the terminal 40, or may be configured to transmit data between the terminal 40 and the external apparatus.

The memory 49 may be configured to store a software program and various data. The memory 49 may mainly include a program storage area and a data storage area. The program storage area may store an operating system, an application program required for at least one function (such as a sound play function and an image play function), and the like. The data storage area may store data created based on use of the terminal (such as audio data and a phone book), and the like. In addition, the memory 49 may include a high-speed random access memory, or may include a non-volatile memory, for example, at least one magnetic disk storage device, a flash memory, or other non-volatile solid-state storage devices.

The processor 410 is a control center of the terminal. The processor 410 uses various interfaces and lines to connect all parts of the entire terminal, and performs various functions and data processing of the terminal by running or executing the software programs and/or modules stored in the memory 49 and calling data stored in the memory 49, thereby performing overall monitoring on the terminal. The processor 410 may include one or more processing units. Optionally, the processor 410 may integrate an application processor and a modem processor. The application processor mainly processes the operating system, user interface, application program, and the like. The modem processor mainly processes wireless communication. It may be understood that the modem processor may alternatively not be integrated into the processor 410.

The terminal 40 may further include the power supply 411 (for example, a battery) supplying power to all components. Optionally, the power supply 411 may be logically connected to the processor 410 through a power management system. In this way, functions such as charge management, discharge management, and power consumption management are implemented by using the power management system.

In addition, the terminal 40 includes some functional modules that are not illustrated. Details are not described herein.

Optionally, an embodiment of this disclosure further provides a terminal, including a processor 410, a memory 49, a computer program stored in the memory 49 and capable of running on the processor 410. When the computer program is executed by the processor 410, the processes of the embodiment of the method for determining a radio link state are implemented, and a same technical effect can be achieved. To avoid repetition, details are not described again herein. The terminal may be a wireless terminal or a wired terminal. The wireless terminal may be a device that provides the user with voice and/or other service data connectivity, a handheld device with a wireless connection function, or another processing device connected to a wireless modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile, a remote station, a remote terminal, an access terminal, a user terminal, a user agent, or a user device (User Device or User Equipment). This is not limited herein.

An embodiment of this disclosure further provides a computer-readable storage medium, where the computer-readable storage medium stores a computer program. When the computer program is executed by a processor, the procedures of the foregoing embodiments of the method for determining a radio link state is implemented, with the same technical effects achieved. To avoid repetition, details are not described again herein. The computer-readable storage medium is, for example, a read-only memory ROM), a random access memory (RAM), a magnetic disk, or an optical disc.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the embodiments provided in this application, it should be understood that the disclosed apparatus and method may be implemented in other manners. For example, the described apparatus embodiments are merely examples. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be indirect couplings or communication connections through some interfaces, apparatuses or units, and may be implemented in electronic, mechanical, or other forms.

The units described as separate parts may or may not be physically separate. Parts displayed as units may or may not be physical units, and may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the prior art, or some of the technical solutions may be embodied in a form of a software product. The computer software product is stored in a storage medium, and includes several instructions for instructing a computer device (which may be a personal computer, a server, a network device, or the like) to perform all or some of the steps of the methods described in the embodiments of this disclosure. The foregoing storage medium includes: any medium that can store program code, such as a USB flash drive, a removable hard disk, a ROM, a RAM, a magnetic disk, or an optical disc.

In addition, it should be noted that in the apparatus and method of this disclosure, apparently, the components or steps may be decomposed and/or recombined. The decomposition and/or recombination should be considered as an equivalent solution of this disclosure. In addition, the steps for performing the foregoing series of processing may be naturally performed in a time sequence as described, but do not necessarily need to be performed in such time sequence, and some steps may be performed in parallel or separately. A person of ordinary skill in the art can understand that all or any steps or components of the method and apparatus in this disclosure may be implemented by hardware, firmware, software, or a combination thereof in any computing apparatus (including a processor, a storage medium, and the like) or a network of computing apparatuses. This can be implemented as long as a person of ordinary skill in the art applies basic programming skill after reading the specification of this disclosure.

Therefore, the objectives of this disclosure may also be achieved by running a program or a group of programs on any computing apparatus. The computing apparatus may be a well-known general-purpose apparatus. Therefore, the objectives of this disclosure may also be achieved by merely providing a program product including program code for implementing the method or apparatus. To be specific, the program product also constitutes this disclosure, and a storage medium storing the program product also constitutes this disclosure. Apparently, the storage medium may be any well-known storage medium or any storage medium that will be developed in the future. It should also be noted that in the apparatus and method of this disclosure, apparently, the components or steps may be decomposed and/or recombined. The decomposition and/or recombination should be considered as an equivalent solution of this disclosure. In addition, the steps for performing the foregoing series of processing may be naturally performed in a time sequence as described, but do not necessarily need to be performed in such time sequence. Some steps may be performed in parallel or separately.

The foregoing descriptions are merely optional implementations of this disclosure. It should be noted that a person of ordinary skill in the art may make several improvements or polishing without departing from the principle of this disclosure and the improvements and polishing shall fall within the protection scope of this disclosure.

What is claimed is:

1. A method for determining a radio link state, comprising:
   performing detection for target reference signals on target resources configured by a network device, to obtain a detection result; and
   determining, based on the detection result of the target reference signals, a radio link state; wherein the radio link state is that whether at least part of the target reference signals are missed;
   wherein the step of determining, based on the detection result of the target reference signals, the radio link state comprises:
   determining, based on a quantity and quality parameters of missed target reference signals, the radio link state; wherein the quantity of the missed target reference signals is obtained through calculation based on the quantity of the target reference signals that are configured by the network device and a quantity of target reference signals that are unmissed;
   wherein when the target reference signals are radio link monitoring reference signals (RLM-RSs), the step of determining, based on a quantity and quality parameters of unmissed target reference signals, the radio link state comprises:
   when a first quantity of RLM-RSs whose quality parameters are greater than or equal to a first threshold is greater than or equal to a fifth value, determining that the radio link state is in-synchronization IS, and reporting IS indication information to an upper layer;
   when a second quantity of RLM-RSs whose quality parameters are less than or equal to a second threshold is greater than or equal to a sixth value, determining that the radio link state is OOS, and reporting OOS indication information to the upper layer;
   when a third quantity of missed RLM-RSs is greater than or equal to a seventh value, determining that the radio link state is that at least part of reference signals corresponding to RLM are missed, and reporting third indication information to the upper layer, wherein the third indication information is used to indicate that at least part of reference signals corresponding to RLM are missed;
when the second quantity is less than or equal to an eighth value, or the third quantity is less than or equal to a ninth value, or a sum of the second quantity and the third quantity is less than or equal to a tenth value, determining that the radio link state is IS, and reporting IS indication information to the upper layer; and,
when the sum of the second quantity and the third quantity is greater than or equal to an eleventh value, determining that the radio link state is OOS, and reporting OOS indication information to the upper layer.

2. The method for determining a radio link state according to claim 1, wherein the step of determining, based on the detection result of the target reference signals, a radio link state further comprises:
determining, based on a quantity of unmissed target reference signals, the radio link state.

3. The method for determining a radio link state according to claim 1, wherein the step of determining, based on a quantity of missed target reference signals, the radio link state comprises:
determining, based on the quantity of missed target reference signals, that the radio link state is that at least part of the target reference signals are missed, and reporting first indication information to an upper layer, wherein the first indication information is used to indicate that at least part of the target reference signals are missed; or,
determining, based on the quantity of missed target reference signals, that the radio link state is that at least part of the target reference signals are missed, and reporting second indication information to an upper layer, wherein the second indication information is used to indicate a quantity or a ratio of missed target reference signals.

4. The method for determining a radio link state according to claim 1, wherein the step of determining, based on the quantity of missed target reference signals, that the radio link state is that at least part of the target reference signals are missed, and reporting first indication information to an upper layer further comprises:
when the target reference signals are radio link monitoring reference signals (RLM-RSs), if a quantity of missed RLM-RSs is greater than or equal to a first value, determining that the radio link state is that at least part of reference signals corresponding to RLM are missed, and reporting first indication information to the upper layer, wherein the first indication information is used to indicate that at least part of reference signals corresponding to RLM are missed; or,
when the target reference signals are beam failure detection reference signals (BFD-RSs), if a quantity of missed BFD-RSs is greater than or equal to a second value, determining that the radio link state is that at least part of reference signals corresponding to BFD are missed, and reporting first indication information to the upper layer, wherein the first indication information is used to indicate that at least part of reference signals corresponding to BFD are missed.

5. The method for determining a radio link state according to claim 3, wherein the step of determining, based on the quantity of missed target reference signals, that the radio link state is that at least part of the target reference signals are missed, and reporting second indication information to an upper layer comprises:
when the target reference signals are radio link monitoring reference signals (RLM-RSs), if a quantity of missed RLM-RSs is greater than 0, determining that the radio link state is that at least part of reference signals corresponding to RLM are missed, and reporting second indication information to the upper layer, wherein the second indication information is used to indicate a quantity or a ratio of missed reference signals corresponding to RLM; or
when the target reference signals are beam failure detection reference signals (BFD-RSs), if a quantity of missed BFD-RSs is greater than 0, determining that the radio link state is that at least part of reference signals corresponding to BFD are missed, and reporting second indication information to the upper layer, wherein the second indication information is used to indicate a quantity or a ratio of missed reference signals corresponding to BFD.

6. The method for determining a radio link state according to claim 1, wherein the step of determining, based on a quantity of missed target reference signals, the radio link state comprises:
when the target reference signals are radio link monitoring reference signals (RLM-RSs), if a quantity of missed RLM-RSs is greater than or equal to a third value, determining that the radio link state is out-of-synchronization (OOS), and reporting OOS indication information to an upper layer; or
when the target reference signals are beam failure detection reference signals (BFD-RSs), if a quantity of missed BFD-RSs is greater than or equal to a fourth value, determining that the radio link state is a beam failure, and reporting beam failure instance BFI indication information to an upper layer.

7. The method for determining a radio link state according to claim 2, wherein when the target reference signals are beam failure detection reference signals (BFD-RSs), the step of determining, based on a quantity and quality parameters of unmissed target reference signals, the radio link state comprises at least one of the following:
when a quantity of missed BFD-RSs is greater than or equal to a twelfth value, determining that the radio link state is that at least part of reference signals corresponding to BFD are missed, and reporting fourth indication information to an upper layer, wherein the fourth indication information is used to indicate that at least part of reference signals corresponding to BFD are missed;
when a quantity of BFD-RSs whose quality parameters are less than or equal to a third threshold is greater than or equal to a thirteenth value, determining that the radio link state is a beam failure, and reporting BFI indication information to the upper layer; or,
when a sum of the quantity of missed BFD-RSs and the quantity of the BFD-RSs whose quality parameters are less than or equal to the third threshold is greater than or equal to a fourteenth value, determining that the radio link state is a beam failure, and reporting BFI indication information to the upper layer.

8. The method for determining a radio link state according to claim 2, wherein the quality parameter comprises at least one of a signal to interference plus noise ratio (SINR), reference signal received power (RSRP), reference signal received quality (RSRQ), or a block error ratio (BLER).

9. The method for determining a radio link state according to claim 1, wherein the performing detection for target reference signals on the target resources configured by the network device to obtain the detection result comprises:
performing detection for target reference signals on the target resources configured by the network device in an unlicensed frequency band transmission scenario of a new radio (NR) system, to obtain the detection result;
wherein the determining, based on the quantity of missed target reference signals, the radio link state comprises:
determining, based on a quantity of missed target reference signals in an entire activated BWP in a serving cell, the radio link state; wherein the quantity of the missed target reference signals is obtained through calculation based on the quantity of the target reference signals that are configured by the network device in the entire activated BWP and a quantity of target reference signals that are unmissed in the entire activated BWP;
wherein the quantity of missed BFD-RSs is a quantity of missed BFD-RSs in the entire activated BWP.

10. A terminal, comprising a processor, a memory, and a program stored in the memory, wherein when the program is executed by the processor, steps of a method for determining a radio link state are implemented, wherein the method comprises:
performing detection for target reference signals on target resources configured by a network device, to obtain a detection result; and
determining, based on the detection result of the target reference signals, a radio link state; wherein the radio link state is that whether at least part of the target reference signals are missed;
wherein the step of determining, based on the detection result of the target reference signals, the radio link state comprises:
determining, based on a quantity and quality parameters of missed target reference signals, the radio link state; wherein the quantity of the missed target reference signals is obtained through calculation based on the quantity of the target reference signals that are configured by the network device and a quantity of target reference signals that are unmissed;
wherein when the target reference signals are radio link monitoring reference signals (RLM-RSs), the step of determining, based on a quantity and quality parameters of unmissed target reference signals, the radio link state comprises:
when a first quantity of RLM-RSs whose quality parameters are greater than or equal to a first threshold is greater than or equal to a fifth value, determining that the radio link state is in-synchronization IS, and reporting IS indication information to an upper layer;
when a second quantity of RLM-RSs whose quality parameters are less than or equal to a second threshold is greater than or equal to a sixth value, determining that the radio link state is OOS, and reporting OOS indication information to the upper layer;
when a third quantity of missed RLM-RSs is greater than or equal to a seventh value, determining that the radio link state is that at least part of reference signals corresponding to RLM are missed, and reporting third indication information to the upper layer, wherein the third indication information is used to indicate that at least part of reference signals corresponding to RLM are missed;
when the second quantity is less than or equal to an eighth value, or the third quantity is less than or equal to a ninth value, or a sum of the second quantity and the third quantity is less than or equal to a tenth value, determining that the radio link state is IS, and reporting IS indication information to the upper layer; and,
when the sum of the second quantity and the third quantity is greater than or equal to an eleventh value, determining that the radio link state is OOS, and reporting OOS indication information to the upper layer.

11. The terminal according to claim 10, wherein the step of determining, based on the detection result of the target reference signals, a radio link state further comprises:
determining, based on a quantity of unmissed target reference signals, the radio link state.

12. The terminal according to claim 10, wherein the step of determining, based on a quantity of missed target reference signals, the radio link state comprises:
determining, based on the quantity of missed target reference signals, that the radio link state is that at least part of the target reference signals are missed, and reporting first indication information to an upper layer, wherein the first indication information is used to indicate that at least part of the target reference signals are missed; or,
determining, based on the quantity of missed target reference signals, that the radio link state is that at least part of the target reference signals are missed, and reporting second indication information to an upper layer, wherein the second indication information is used to indicate a quantity or a ratio of missed target reference signals.

13. The terminal according to claim 10, wherein the step of determining, based on the quantity of missed target reference signals, that the radio link state is that at least part of the target reference signals are missed, and reporting first indication information to an upper layer further comprises:
when the target reference signals are radio link monitoring reference signals (RLM-RSs), if a quantity of missed RLM-RSs is greater than or equal to a first value, determining that the radio link state is that at least part of reference signals corresponding to RLM are missed, and reporting first indication information to the upper layer, wherein the first indication information is used to indicate that at least part of reference signals corresponding to RLM are missed; or,
when the target reference signals are beam failure detection reference signals (BFD-RSs), if a quantity of missed BFD-RSs is greater than or equal to a second value, determining that the radio link state is that at least part of reference signals corresponding to BFD are missed, and reporting first indication information to the upper layer, wherein the first indication information is used to indicate that at least part of reference signals corresponding to BFD are missed.

14. The terminal according to claim 12, wherein the step of determining, based on the quantity of missed target reference signals, that the radio link state is that at least part of the target reference signals are missed, and reporting second indication information to an upper layer comprises:
when the target reference signals are radio link monitoring reference signals (RLM-RSs), if a quantity of missed RLM-RSs is greater than 0, determining that the radio link state is that at least part of reference signals corresponding to RLM are missed, and reporting second indication information to the upper layer, wherein the second indication information is used to indicate a quantity or a ratio of missed reference signals corresponding to RLM; or
when the target reference signals are beam failure detection reference signals (BFD-RSs), if a quantity of missed BFD-RSs is greater than 0, determining that the radio link state is that at least part of reference signals corresponding to BFD are missed, and reporting second indication information to the upper layer, wherein the second indication information is used to indicate a quantity or a ratio of missed reference signals corresponding to BFD.

15. The terminal according to claim 11, wherein the step of determining, based on a quantity of missed target reference signals, the radio link state comprises:
when the target reference signals are radio link monitoring reference signals (RLM-RSs), if a quantity of missed RLM-RSs is greater than or equal to a third value, determining that the radio link state is out-of-synchronization (OOS), and reporting OOS indication information to an upper layer; or
when the target reference signals are beam failure detection reference signals (BFD-RSs), if a quantity of missed BFD-RSs is greater than or equal to a fourth value, determining that the radio link state is a beam failure, and reporting beam failure instance BFI indication information to an upper layer.

16. The terminal according to claim 11, wherein when the target reference signals are beam failure detection reference signals (BFD-RSs), the step of determining, based on a quantity and quality parameters of unmissed target reference signals, the radio link state comprises at least one of the following:
when a quantity of missed BFD-RSs is greater than or equal to a twelfth value, determining that the radio link state is that at least part of reference signals corresponding to BFD are missed, and reporting fourth indication information to an upper layer, wherein the fourth indication information is used to indicate that at least part of reference signals corresponding to BFD are missed;
when a quantity of BFD-RSs whose quality parameters are less than or equal to a third threshold is greater than or equal to a thirteenth value, determining that the radio link state is a beam failure, and reporting BFI indication information to the upper layer; or,
when a sum of the quantity of missed BFD-RSs and the quantity of the BFD-RSs whose quality parameters are less than or equal to the third threshold is greater than or equal to a fourteenth value, determining that the radio link state is a beam failure, and reporting BFI indication information to the upper layer.

17. The terminal according to claim 11, wherein the quality parameter comprises at least one of a signal to interference plus noise ratio (SINR), reference signal received power (RSRP), reference signal received quality (RSRQ), or a block error ratio (BLER).

18. A non-transitory computer-readable storage medium, storing a program, wherein when the program is executed by a processor, steps of a method for determining a radio link state are implemented, wherein the method comprises:
performing detection for target reference signals on target resources configured by a network device, to obtain a detection result; and
determining, based on the detection result of the target reference signals, a radio link state; wherein the radio link state is that whether at least part of the target reference signals are missed;
wherein the step of determining, based on the detection result of the target reference signals, the radio link state comprises:
determining, based on a quantity and quality parameters of missed target reference signals, the radio link state; wherein the quantity of the missed target reference signals is obtained through calculation based on the quantity of the target reference signals that are configured by the network device and a quantity of target reference signals that are unmissed;
wherein when the target reference signals are radio link monitoring reference signals (RLM-RSs), the step of determining, based on a quantity and quality parameters of unmissed target reference signals, the radio link state comprises:
when a first quantity of RLM-RSs whose quality parameters are greater than or equal to a first threshold is greater than or equal to a fifth value, determining that the radio link state is in-synchronization IS, and reporting IS indication information to an upper layer;
when a second quantity of RLM-RSs whose quality parameters are less than or equal to a second threshold is greater than or equal to a sixth value, determining that the radio link state is OOS, and reporting OOS indication information to the upper layer;
when a third quantity of missed RLM-RSs is greater than or equal to a seventh value, determining that the radio link state is that at least part of reference signals corresponding to RLM are missed, and reporting third indication information to the upper layer, wherein the third indication information is used to indicate that at least part of reference signals corresponding to RLM are missed;
when the second quantity is less than or equal to an eighth value, or the third quantity is less than or equal to a ninth value, or a sum of the second quantity and the third quantity is less than or equal to a tenth value, determining that the radio link state is IS, and reporting IS indication information to the upper layer; and,
when the sum of the second quantity and the third quantity is greater than or equal to an eleventh value, determining that the radio link state is OOS, and reporting OOS indication information to the upper layer.

* * * * *